US011787472B2

United States Patent
Zemskov et al.

(10) Patent No.: US 11,787,472 B2
(45) Date of Patent: Oct. 17, 2023

(54) POWERED RIDE-ON VEHICLE

(71) Applicant: Radio Flyer Inc., Chicago, IL (US)

(72) Inventors: Igor Zemskov, Chicago, IL (US); Daniel Greenberg, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 366 days.

(21) Appl. No.: 16/993,524

(22) Filed: Aug. 14, 2020

(65) Prior Publication Data

US 2021/0046975 A1 Feb. 18, 2021

Related U.S. Application Data

(60) Provisional application No. 62/887,734, filed on Aug. 16, 2019.

(51) Int. Cl.
*B60L 15/20* (2006.01)
*B60K 1/02* (2006.01)
(Continued)

(52) U.S. Cl.
CPC ............... *B62D 11/04* (2013.01); *B60K 1/02* (2013.01); *B60L 15/20* (2013.01); *B60L 50/60* (2019.02);
(Continued)

(58) Field of Classification Search
CPC .............................. B60K 1/02; B60K 7/0007; B60K 2001/0438; B60K 2007/0038; B60L 15/20; B60L 50/60; B60L 2220/46; B60L 2240/24; B60L 2250/00; B60L 2200/20; B60Y 2200/81; B62D 1/04; B62D 6/007;
(Continued)

(56) References Cited

U.S. PATENT DOCUMENTS

| 7,344,430 B2 | 3/2008 | Hasty et al. |
| 8,141,668 B2 | 3/2012 | Huntsberger et al. |
| 2018/0099230 A1* | 4/2018 | Young ................. B60L 15/2009 |

FOREIGN PATENT DOCUMENTS

| EP | 2937840 A2 * | 10/2015 | ............... G07C 5/06 |
| WO | WO2018183347 | 10/2018 | |

OTHER PUBLICATIONS

International Search Report and Written Opinion issued to PCT/US20/46374, dated Nov. 30, 2020 (10 pages).
(Continued)

*Primary Examiner* — Kevin Hurley
*Assistant Examiner* — Felicia L. Brittman
(74) *Attorney, Agent, or Firm* — Barnes & Thornburg LLP

(57) ABSTRACT

A powered ride-on vehicle having a frame supported by a first drive wheel, a second drive wheel and at least one non-driven support wheel. The vehicle has a first motor connected to the first drive wheel, a second motor connected to the second drive wheel, a steering wheel, a plurality of movement selectors, a dance selector, and one or more controllers operably electrically connected to the motors, the plurality of movement selectors, and the dance selector. The controllers operate to manipulate the motors to cause movements of the vehicle for a set period of time upon depression of one of the plurality of movement selectors independent of an angular location of the steering wheel. The controllers further operate to manipulate the motors to cycle through at least four different dances based on subsequent depression of the dance selector.

17 Claims, 7 Drawing Sheets

(51) Int. Cl.
*B62D 6/00* (2006.01)
*B62D 11/04* (2006.01)
*B60L 50/60* (2019.01)
*B62D 1/04* (2006.01)
*B62D 15/02* (2006.01)
*G07C 5/06* (2006.01)
*G05D 1/00* (2006.01)

(52) U.S. Cl.
CPC ............... *B62D 1/04* (2013.01); *B62D 6/007* (2013.01); *B62D 15/023* (2013.01); *G05D 1/0011* (2013.01); *G07C 5/06* (2013.01); *B60L 2200/20* (2013.01); *G05D 2201/0214* (2013.01)

(58) Field of Classification Search
CPC .... B62D 11/04; B62D 15/023; G05D 1/0011; G05D 2201/0214; G07C 5/06; Y02T 10/70; Y02T 10/72
USPC ........................................................ 180/6.24
See application file for complete search history.

(56) References Cited

OTHER PUBLICATIONS

"Best 12v Jeep out there!! ," accessed online at: shorturl.at/wxBCR (available at least as early as Aug. 14, 2020).

\* cited by examiner

POWERED RIDE-ON VEHICLE

CROSS-REFERENCE TO RELATED APPLICATIONS

This application claims the benefit of U.S. Provisional Patent Application No. 62/887,734 filed Aug. 16, 2019, which is expressly incorporated herein by reference and made a part hereof.

FEDERALLY SPONSORED RESEARCH OR DEVELOPMENT

Not Applicable.

TECHNICAL FIELD

The present disclosure generally relates to a powered vehicle, and in particular, to a battery-powered ride-on vehicle with standard drive, spin drive and dance drive capabilities.

BACKGROUND

Ride-on vehicles, including multiple drive ride-on vehicles, are known, as are battery powered vehicles. However, standard battery powered and multiple drive ride-on vehicles have numerous deficiencies and limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to certain aspects of the present disclosure, the disclosed subject technology relates to a ride-on vehicle that has various drive modes and dance modes.

The disclosed technology further relates to a powered ride-on vehicle comprising: a frame supported by a first drive wheel, a second drive wheel and at least one non-driven support wheel; a first motor connected to the first drive wheel; a second motor connected to the second drive wheel; a steering wheel supported by the frame; a plurality of movement selectors and a dance selector; a steering sensor operably connected to the steering wheel to obtain an output of the angular location of the steering wheel; and, one or more controllers operably electrically connected to the first and second motors, the plurality of movement selectors, the dance selector, and the steering wheel sensor, wherein the controllers operate to manipulate the motors to cause movements of the vehicle for a set period of time upon depression of one of the plurality of movement selectors independent of the output obtained by the steering sensor, and wherein the controllers operate to manipulate the motors to cause dance movements of the vehicle for a set period of time upon depression of the dance selector independent of an output obtained by the steering sensor.

The disclosed technology further relates to a powered ride-on vehicle comprising: a frame supported by a first drive wheel, a second drive wheel and at least one non-driven support wheel; a first motor connected to the first drive wheel; a second motor connected to the second drive wheel; a steering wheel supported by the frame; a dance selector connected to the steering wheel; and, one or more controllers operably electrically connected to the first and second motors and the dance selector, wherein the controllers operate to manipulate the motors to cause dance movements of the vehicle for a set period of time upon depression of the dance selector, wherein the dance movements of the vehicle are choreographed in at least four different dances, and wherein the controllers operates to manipulate the motors to cycle through the at least four different dances based on subsequent depression of the dance selector.

The disclosed technology further relates to a powered ride-on vehicle comprising: a frame supported by a first drive wheel, a second drive wheel and at least one non-driven support wheel; a first motor connected to the first drive wheel; a second motor connected to the second drive wheel; a steering wheel supported by the frame; a plurality of movement selectors connected to the steering wheel; and, one or more controllers operably electrically connected to the first and second motors and the plurality of movement selectors, wherein the controllers operate to manipulate the motors to cause movements of the vehicle for a set period of time upon depression of one of the plurality of movement selectors independent of an angular location of the steering wheel, wherein depression of each different one or more plurality of movement selectors operate to cause a different movement of the vehicle for the set period of time independent of the angular location of the steering wheel, and wherein when one of the plurality of movement selectors is depressed, the one or more controllers operate to cause the motors to move the vehicle for a set period of time independent of the angular location of the steering wheel until either the set period of time elapses, another of the plurality of movement selectors is depressed, or until the selector that was depressed is no longer depressed and at least two cycles of the set period of time have elapsed.

The disclosed technology further relates to a powered ride-on wherein different movements of the vehicle are effected for another set period of time upon subsequent depression of the dance selector or one of the movement selectors prior to the expiration of the set period of time.

The disclosed technology further relates to a powered ride-on vehicle wherein the plurality of movement selectors and the dance selector are connected to the steering wheel.

The disclosed technology further relates to a powered ride-on vehicle further comprising a go selector connected to the steering wheel, wherein the controllers are further operably connected to the go selector, and wherein the controllers operate to manipulate the motors to cause the vehicle to move forward, left or right for a period of time that the go selector is depressed depending on the output of the steering sensor.

The disclosed technology further relates to a powered ride-on vehicle wherein the at least one non-driven support wheel is a caster.

The disclosed technology further relates to a powered ride-on vehicle wherein when one of the plurality of movement selectors or the dance selector is depressed, the controllers operate to cause the motors to move the vehicle for a set period of time independent of the output of the steering sensor until either the set period of time elapses, another of the plurality of movement selectors or the dance selector is depressed, a go selector is depressed, or until the selector that was depressed is no longer depressed and at least two cycles of the set period of time have elapsed.

The disclosed technology further relates to a powered ride-on vehicle wherein the motors will stop moving the vehicle after the set period of time elapses and none of the plurality of movement selectors, a go selector or the dance selector has been depressed prior to the expiration of the set period of time, and if the selector that was depressed is still not depressed when the set period of time expires.

The disclosed technology further relates to a powered ride-on vehicle wherein a first of the plurality of movement selectors operates, when depressed and in cooperation with the controllers, to cause the motors to move the vehicle in a left spin for a set period of time independent of the output of the steering sensor.

The disclosed technology further relates to a powered ride-on vehicle wherein the motors will move the vehicle in a left spin for another set period of time, independent of the output of the steering sensor, if the first of the plurality of movement selectors is maintained depressed when the set period of time elapses.

The disclosed technology further relates to a powered ride-on vehicle wherein the motors will stop moving the vehicle after the set period of time elapses and none of the plurality of movement selectors, go selector or the dance selector has been depressed prior to the expiration of the set period of time.

The disclosed technology further relates to a powered ride-on vehicle wherein the controllers operate to manipulate the motors to cause a different dance movement of the vehicle upon subsequent depression of the dance selector independent of an output obtained by the steering sensor.

The disclosed technology further relates to a powered ride-on vehicle wherein the controllers operate to manipulate the motors to cycle through at least four different dance movements based on subsequent depression of the dance selector.

The disclosed technology further relates to a powered ride-on vehicle wherein the controllers operate to light the specific depressed movement selector of the plurality of movement selectors or the dance selector, during the set period of time, or until a different one of the plurality of movement selectors or the dance selector is selected if done prior to the expiration of the set period of time.

The disclosed technology further relates to a powered ride-on vehicle further comprising a light strip associated with a windshield of the vehicle, and wherein the controllers operate to light the light strip for the set period of time after one of the plurality of movement selectors or the dance selector is depressed, or for another set period of time if a different one of the plurality of movement selectors or the dance selector is depressed if done prior to the expiration of the set period of time.

The disclosed technology further relates to a powered ride-on vehicle further comprising a speaker connected to the vehicle, and wherein the controller operates to play music through the speaker during the first period of time, or until a different one of the plurality of movement selectors or the dance selector is selected if done prior to the expiration of the first period of time.

The disclosed technology further relates to a powered ride-on vehicle further comprising a wireless receiver operably electrically connected to the controllers, and a remote control having an input member and a wireless transmitter for sending signals to the one or more controllers of the vehicle, wherein the vehicle can be operated in two modes of operation, including a child only drive mode and a full remote drive mode, and wherein the controller switches between the two modes of operation in real time based on signals received from the remote control.

The disclosed technology further relates to a powered ride-on vehicle wherein one or more of the controllers will operate to repeat the same dance if the dance selector is depressed for the entirety of the set period of time of the dance.

The disclosed technology further relates to a powered ride-on vehicle wherein one or more of the controllers will operate to transition to a next of the at least four dances if the dance selector is depressed again after a specific dance has started.

The disclosed technology further relates to a powered ride-on vehicle wherein one or more of the controllers will operate different music during each dance of the vehicle.

The disclosed technology further relates to a powered ride-on vehicle further comprising a plurality of movement selectors connected to the steering wheel, the plurality of movement selectors operably electrically connected to the one or more controllers, and the one or more controllers operating to manipulate the motors to cause different movements of the vehicle for a set period of time upon depression of one of the plurality of movement selectors independent of an angular position of the steering wheel.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
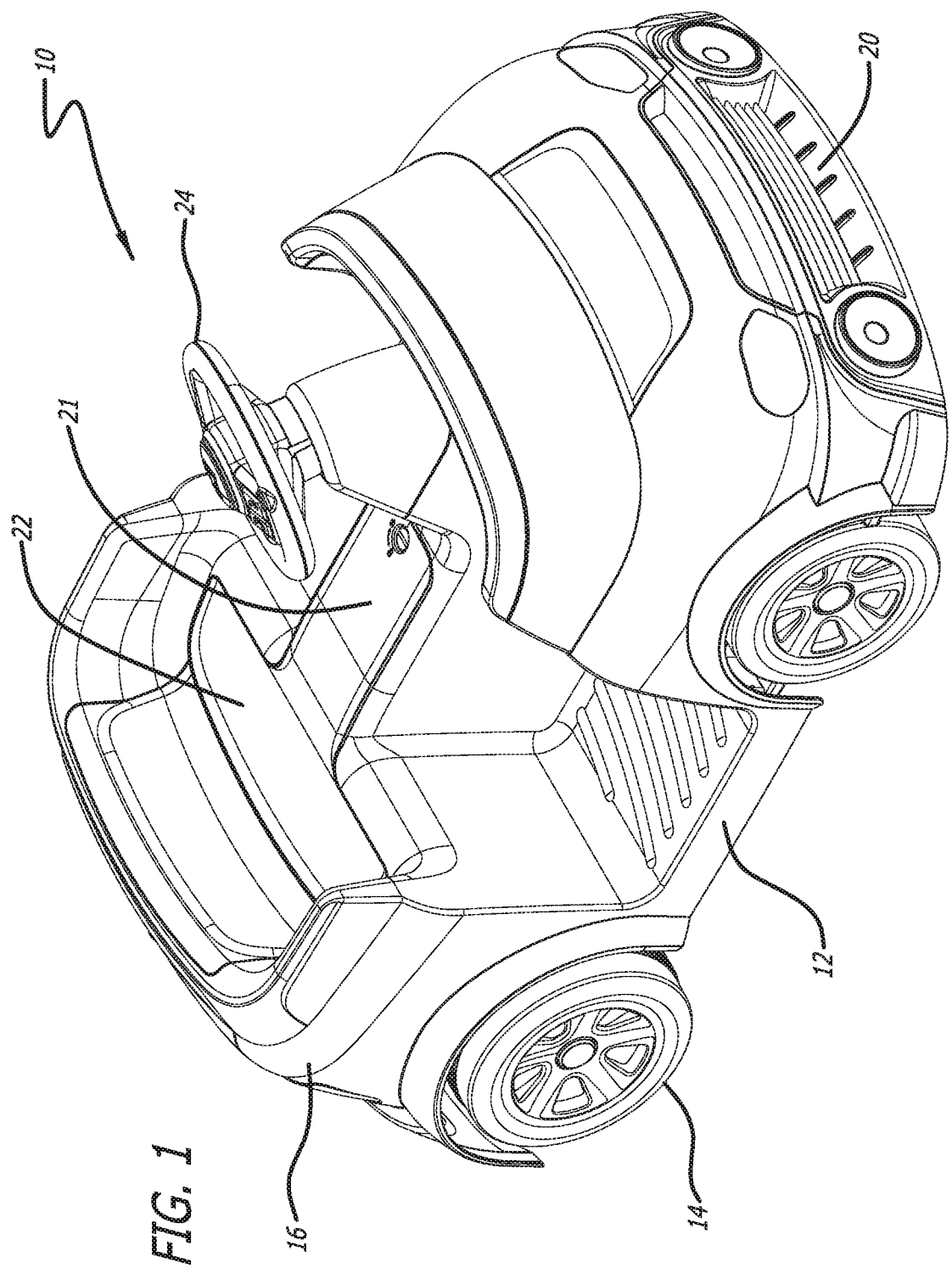
FIG. 1 is a front top perspective view of a powered ride-on vehicle according to one embodiment.

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings of the disclosure.

Figure 8:
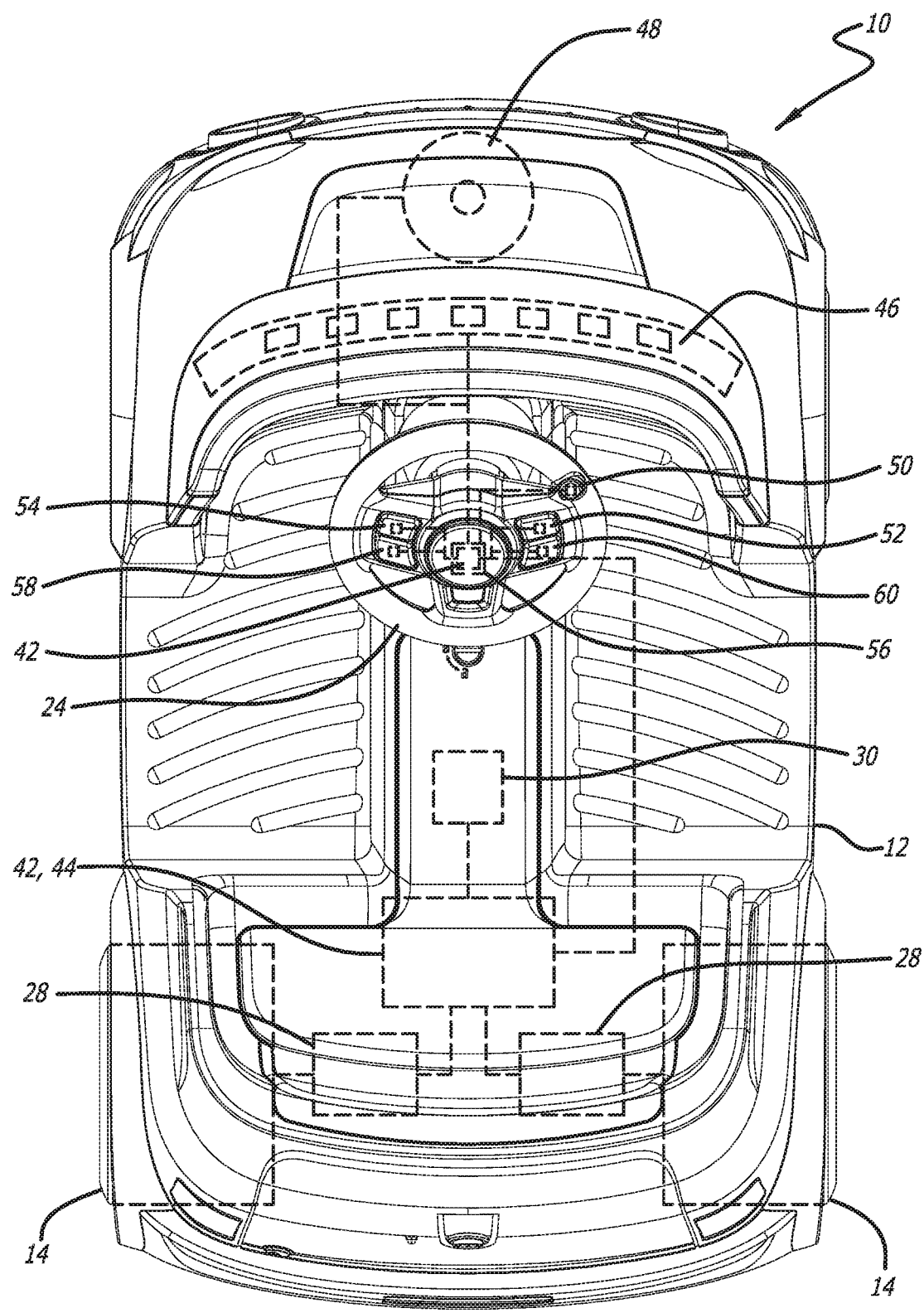
FIG. 8 is top plan view of the powered ride-on vehicle schematically showing a portion of the electrical system according to one embodiment.
Figure 9:
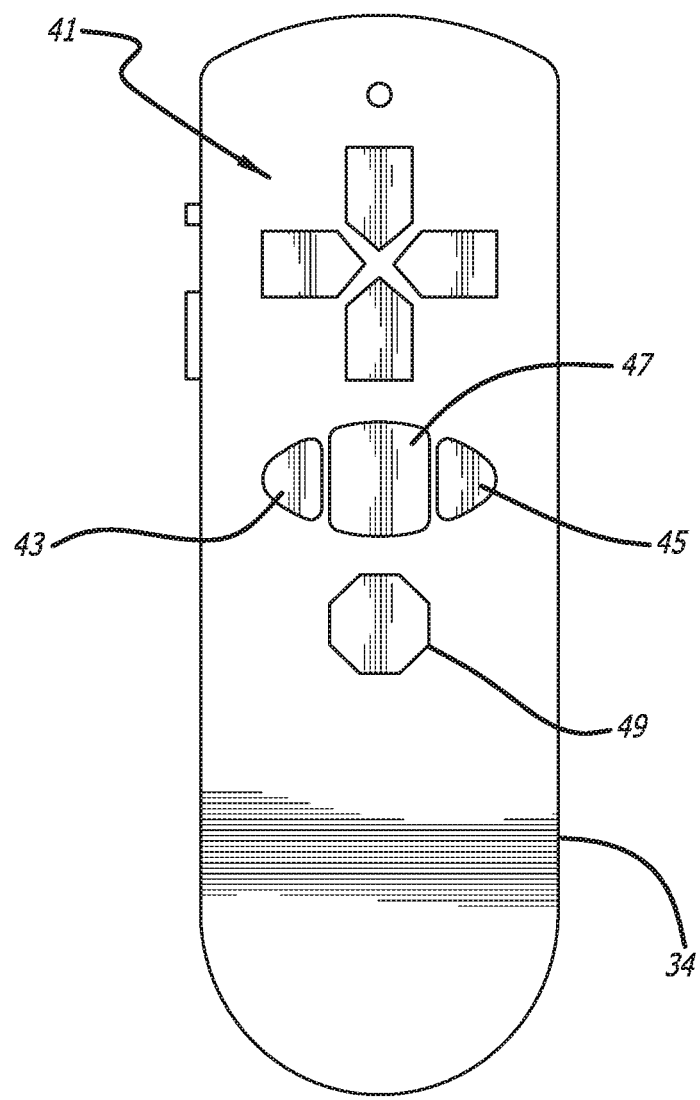
FIG. 9 is a view of a remote control for the powered ride-on vehicle according to one embodiment.

One embodiment of the powered ride-on vehicle is a ride-on vehicle that is preferably used by children and adolescents, but in alternate embodiments may be used by larger individuals, such as adults. Referring now to FIGS. 1 and 8, various embodiments of a powered ride-on vehicle 10 with standard drive, spin drive and dance drive capabilities is shown. The powered vehicle 10 may include a frame 12 supported by a pair of drive wheels 14 and preferably one or more non-drive or follower wheels 18. In one embodiment the drive wheels 14 are provided at the rear portion 16 of the frame 12, and in one embodiment the follower wheels 18 are provided at the forward portion 20 of the frame 12, however, it is understood that the drive wheels 14 may be at the forward portion 20 of the frame 12 and the follower wheels 18 may be provided at the rear portion 16 of the frame 12. It is also understood that in one or more embodiments the follower wheels 18 may preferably be caster-type wheels.

The vehicle 10 also preferably includes a seat 22 to support the rider, a steering wheel 24, and one or more motors 28. In a preferred embodiment, two motors 28 are provided. A first motor 28 is provided to independently drive one of the drive wheels 14, and a second motor 28 is provided to independently drive the other of the drive wheels 14. In one embodiment, the drive motors 28 may be connected to the frame 12 and underneath the seat 22 as shown in FIG. 8. The steering wheel 24 may have a plurality of buttons as shown in FIGS. 4-8. Additionally, since the vehicle is preferably battery powered, a battery 30, which may be a series of rechargeable battery cells, is provided. In one embodiment, the battery is a 6 volt rechargeable battery that is charged by connecting a charger to a charge port 37. The vehicle 10 may also include an on/off switch 32 for the overall vehicle 10. Further, in an alternate embodiment, the vehicle 10 may be controlled remotely in one or more aspects, and thus a remote control 34 and remote control receiver 35 may also be provided.

Figure 2:
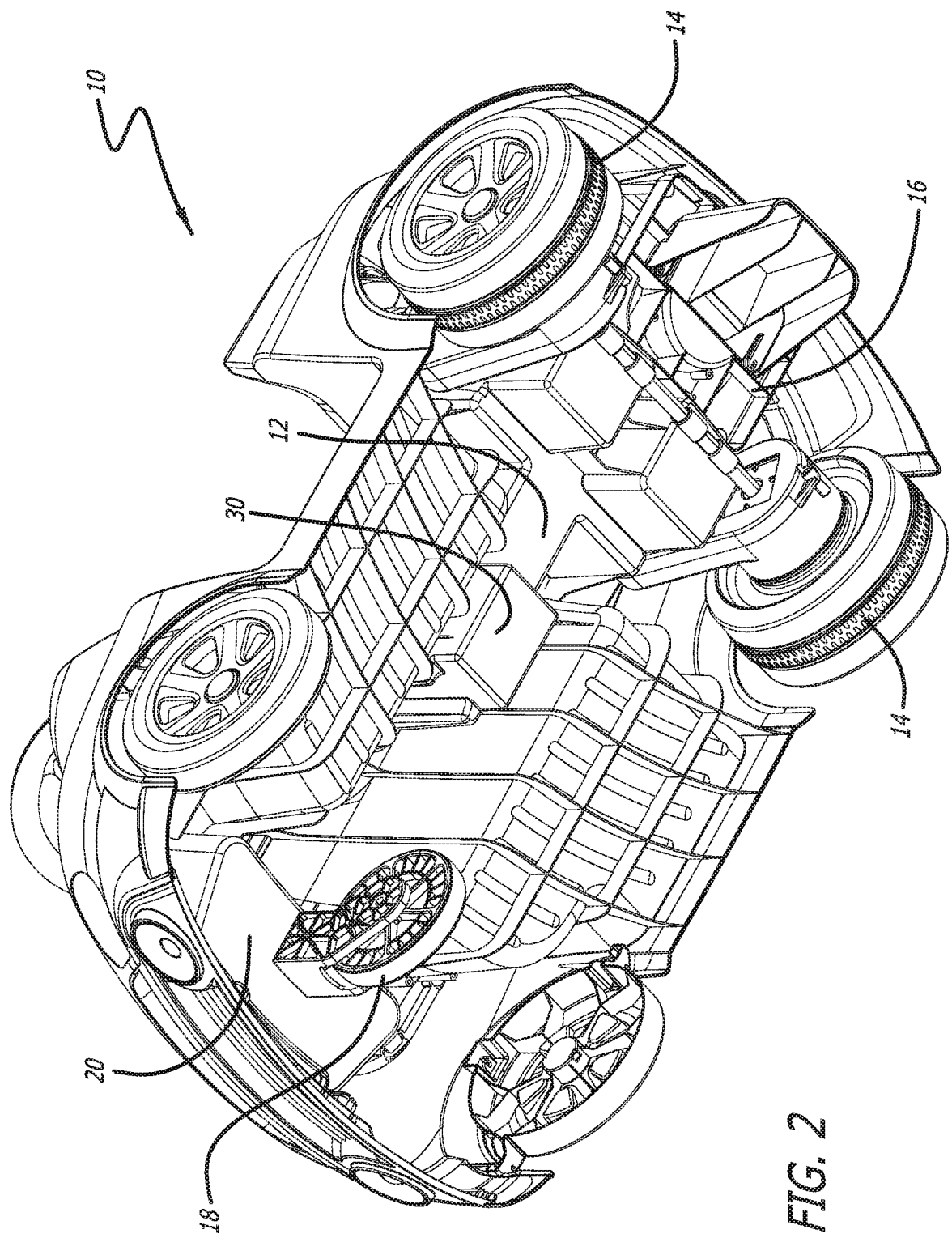
FIG. 2 is a front bottom perspective of a powered ride-on vehicle according to one embodiment.
Figure 3:
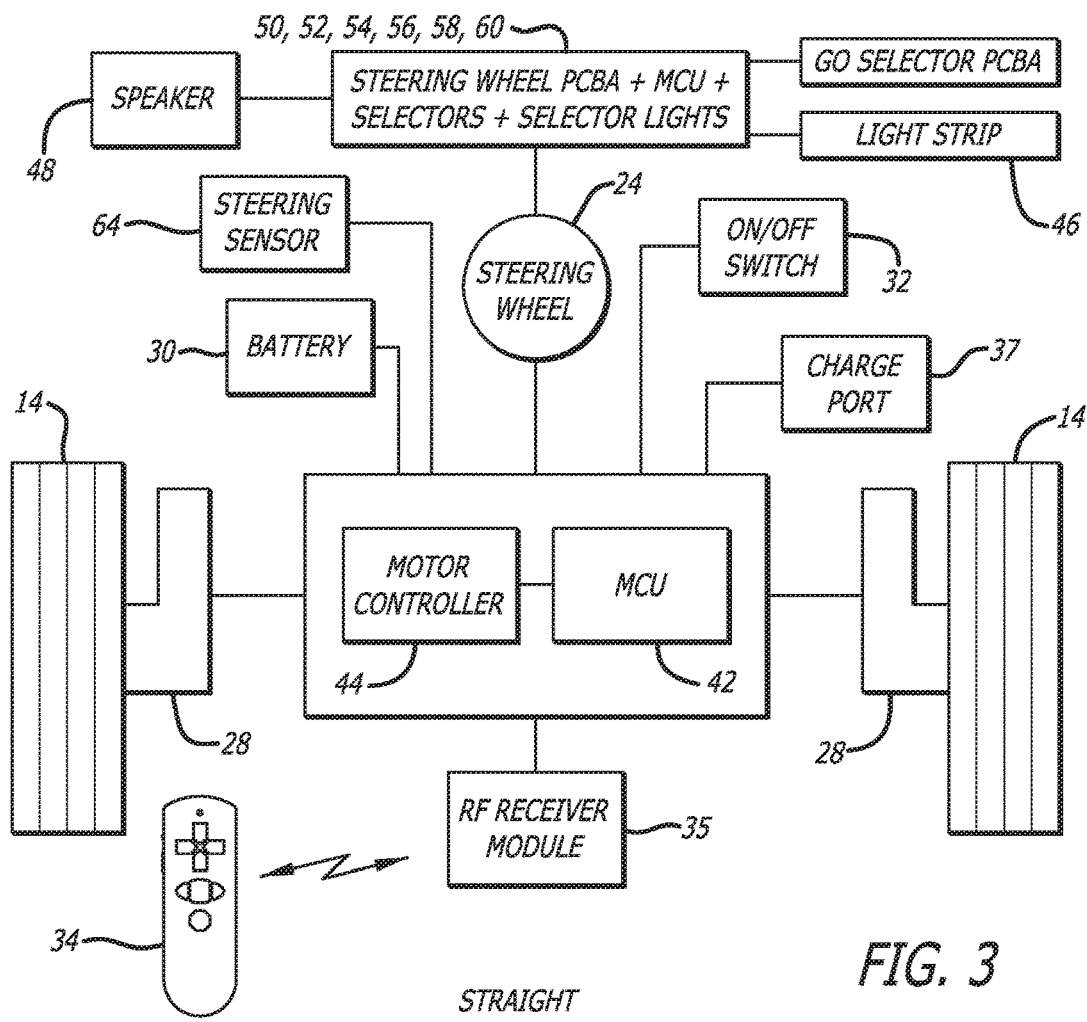
FIG. 3 is a schematic of a powered ride-on vehicle according to one embodiment.

In various embodiments, as shown in FIGS. 2 and 8, the battery 30 may be stored under a center counsel 21 or the seat 22, and accessed by pivoting either the center counsel 21 or the seat 22 upwardly or removing the seat. The battery 30 preferably supplies current to the motors 28 to have the motors 28 rotate the drive wheels 14 to drive the vehicle 10. The vehicle 10 also preferably has one or more controllers 42, such as a microcontroller or MCU 42. In one embodiment the vehicle 10 has a controller 42 associated with a motor controller 44 to control the motors 28 (the controller 42 and motor controller 44 may be an integrated component in and referred to merely as a "controller"), and the vehicle may also have a controller 42 associated with a circuit board in the steering wheel 24 for controlling various items such as lights in the selector buttons, a light strip, etc. The "controller" does not specifically need to be a microcontroller or a microcontroller and a motor controller, and may include different and/or additional or fewer electrical components to accomplish the control functions described herein. In one embodiment, the one or more controllers 42 are operably electrically connected to the first and second motors 28, the plurality of movement selectors (the "spin right" selector 52, "spin left" selector 54, "move forward and backward" dance selector 58, and "rotate side-to-side" dance selector 60), the "dance" selector 56, the "go" selector 50, the steering wheel sensor 64, the battery 30, the speaker 48, the lights 46, the on/off switch 32, the radio control receiver module 35, the charge port 37, etc.

The vehicle 10 can preferably be operated in one of three different modes: (1) full drive mode; (2) spin drive mode; and, (3) dance drive mode. Additionally an emergency stop mode is also provided for safety purposes. In one embodiment, the mode is changed based on the different selectors that are engaged or depressed on the steering wheel 24.

In one embodiment, the vehicle 10 includes lights 46 that light up and music that plays during movement of the vehicle 10. For example, as shown in FIG. 8, the top of the vehicle housing may have a LED light string 46 that lights up when the vehicle 10 moves due to any of the operator actions for movement of the vehicle 10 as described herein. In one embodiment, the LED light string may have lights that can vary in brightness and color. Additionally, the vehicle 10 has at least one speaker 48 that plays music as controlled by one or more of the vehicle controllers 42. The speaker 48, including fake speakers, may have lights 46 as well, for example, around the perimeter of the speaker 48. In one embodiment, the brightness of the lights 46 varies with the volume of the music being played through the speakers 48. In another embodiment, the lights 46 turn on and off, blink, etc. with the music to create an exciting user experience for the user, especially when the user is a small child. Further, as described herein, there are numerous selectors on the steering wheel 24. The selectors may have lights 46 associated therewith that light up, turn on and off, blink, etc., when the music is played and/or when the vehicle 10 is operated to move.

Figure 4:
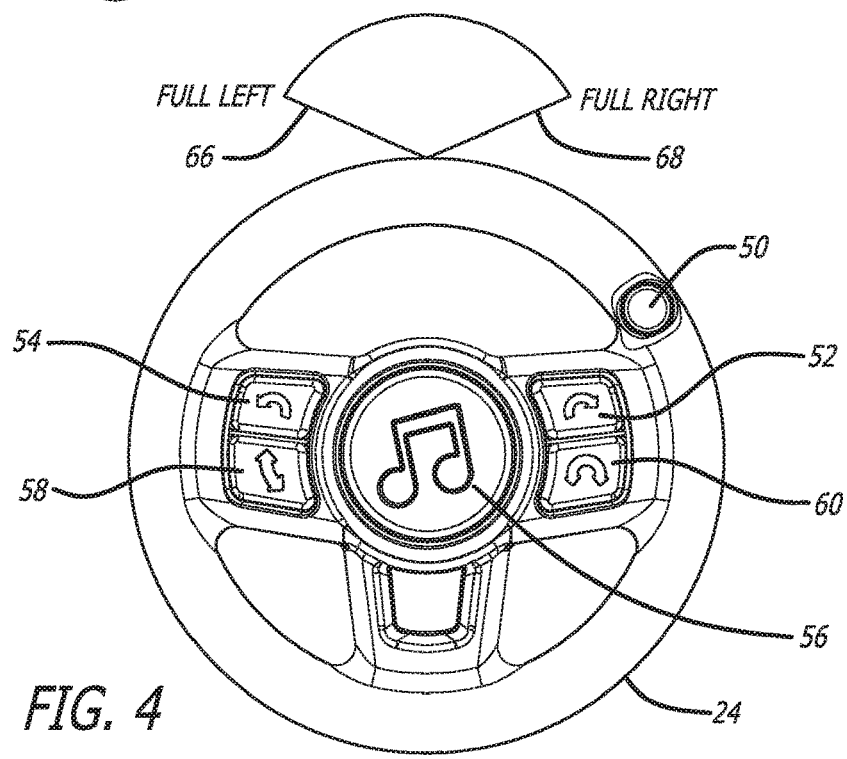
FIG. 4 is an embodiment of a steering wheel for a powered ride-on vehicle according to one embodiment.

Referring to the figures, in a preferred embodiment, while the vehicle 10 has a steering wheel 24, the steering wheel 24 does not control steering of the non-drive or follower wheels 18, rather a variety of signals are sent to the microcontroller(s) 42 to control drive power to the two drive wheels 14. Such signals include, in different drive modes, but are not limited to, a signal from a sensor 64, such as a potentiometer associated with the steering wheel 24, a signal from one or more of the specific selectors on the steering wheel 24 that is engaged or depressed by the user, as signal from a remote control 34 (as described herein) or a remote control receiver module 35, a signal from the battery 30, a signal from the on/off switch 32, etc. As shown in FIG. 4, in one embodiment the steering wheel 24 has a plurality of selectors, including a "go" selector 50, which in one embodiment may be a "go" button 50, a "spin right" selector 52, a "spin left" selector 54, a "dance" selector 56, a "move forward and backward" dance selector 58, and a "rotate side-to-side" dance selector 60. As used herein, the "spin right" selector 52, "spin left" selector 54, "move forward and backward" dance selector 58, and "rotate side-to-side" dance selector 60 may collectively be referred to as movement selectors.

Further, in one embodiment as identified above, a sensor 64 is provided for and/or operably connected to the steering wheel 24 to determine the angular orientation or location of the steering wheel 24 relative to the zero position of the steering wheel 24 and to provide an output of the angular location of the steering wheel 24. In one embodiment the sensor 64 is angle sensor, potentiometer or equivalent sensor, such as an encoder, absolute encoder, 3 position switch, 5 position switch, etc. In one embodiment stops are provided for the steering wheel 24 to limit rotation of the steering wheel 24 in both the left turn and right turn orientations. For example, as shown in FIG. 4, a left turn stop 66 to limit rotation of the steering wheel 24 to the left from the center, and a right turn stop 68 to limit rotation of the steering wheel 24 to the right from the center. The sensor 64 may send an analog or digital signal to one or more of the controllers 42. The signals sent from the sensor 64 typically correspond to the rotation of the steering wheel 24 between the left turn stop 66 and the right turn stop 68.

As explained herein, by operation of the different buttons on the steering wheel 24, the driver can operate the vehicle 10 in three modes: (1) full drive mode; (2) spin drive mode; and, (3) dance drive mode. In full drive mode the driver holds down the "go" selector 50. When the "go" selector 50 is engaged, in one embodiment, the controller 42 sends a signal to the motor controller 44 to have a current provided to the appropriate motors 28 for the drive wheels 14 based on the signal received from the sensor 64 in the steering wheel 24 of the angular orientation of the steering wheel 24.

In one embodiment, whenever any of the selectors 50, 52, 54, 56, 58 or 60 are engaged or depressed (note that the terms engaged and depressed with respect to actuation of the selectors are used interchangeably herein and have the same meaning with respect to operation of the vehicle and the specific selector) that specific selector will light up and remain lit while engaged or depressed by the user, or for a predetermined period of time, or they may blink on and off with associated music for a period of time. Additionally, in one embodiment, whenever any of the selectors 50, 52, 54, 56, 58 or 60 are engaged or depressed, the vehicle will play music for the entirety of time when that specific selector is engaged or for a predetermined set period of time or until a different selector is engaged or depressed.

Figure 5:
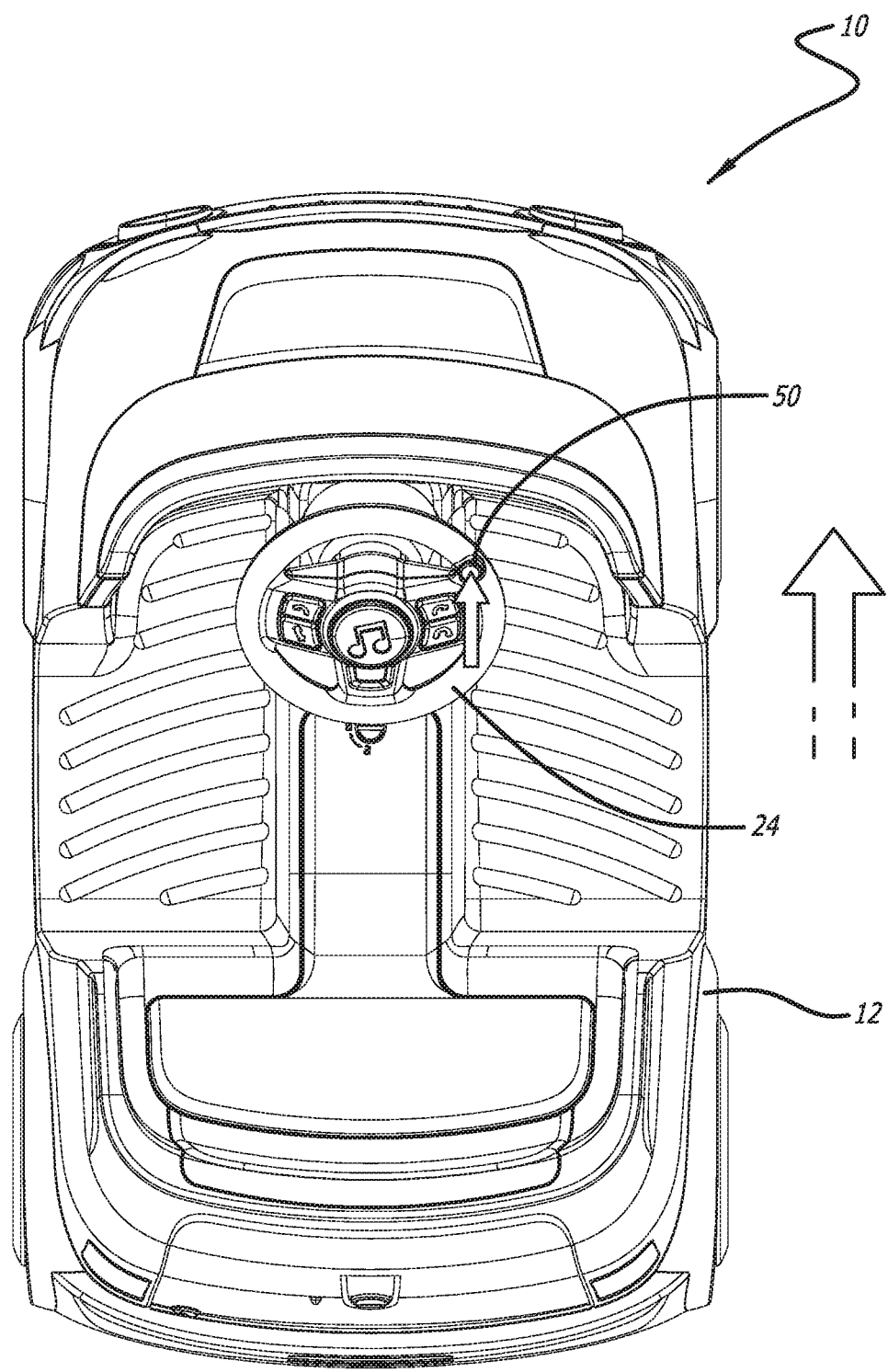
FIG. 5 is top plan view of the powered ride-on vehicle according to one embodiment showing the go mode drive function.

When the driver has control of the vehicle 10 and when the "go" selector 50 is engaged, as shown in FIG. 5, the steering sensor 64 sends a signal to one or more of the controllers 42 indicating that the angular position of the steering wheel 24 to adjust current to the motors 28 to change the power output of each motor 28. For example, in one embodiment, when the steering wheel 24 is turned left, to make the vehicle 10 turn left power to the left motor 28 is decreased while the right motor 28 stays fully powered. By maintaining the right motor at full power and decreasing power to the left motor 28 the vehicle 10 will turn left. Further, the more the steering wheel 24 is turned left, less power will be delivered to the left motor 28, and the more aggressive the left turn will be. Similarly, when the steering wheel 24 is turned right, power to the right motor 28 is decreased while power to the left motor 28 is maintained at full power, thereby causing the vehicle 10 to turn right. Additionally, if the steering wheel 24 is not turned to the left or the right, power will be supplied equally to both rear motors 28 causing the vehicle 10 to drive straight forward. Accordingly, when the "go" selector 50 is engaged the more the steering wheel 24 is turned counter clockwise the sharper the left turning of the vehicle 10. Similarly, when the "go" selector 50 is engaged the more the steering wheel 24 is turned clockwise the sharper the right turning of the vehicle 10. In one embodiment, the music plays and the lights 46 in the light strip light up and/or blink for the entire period of time that the "go" selector 50 is depressed. The brightness and/or blinking of the lights in the light strip 46 may correspond to an amplitude and beat of the music.

As explained herein, in one embodiment, when any of the selectors other than the go selector is depressed (i.e., the dance selector or any of the movement selectors), the controllers 42 operate to manipulate the motors 28 to cause movements of the vehicle 10 for a set period of time independent of the output obtained by the steering sensor. Put another way, in one embodiment the location or movement of the steering wheel has no effect on the movement of the vehicle 10 when any of the movement selectors or the dance selector is depressed.

Figure 6:
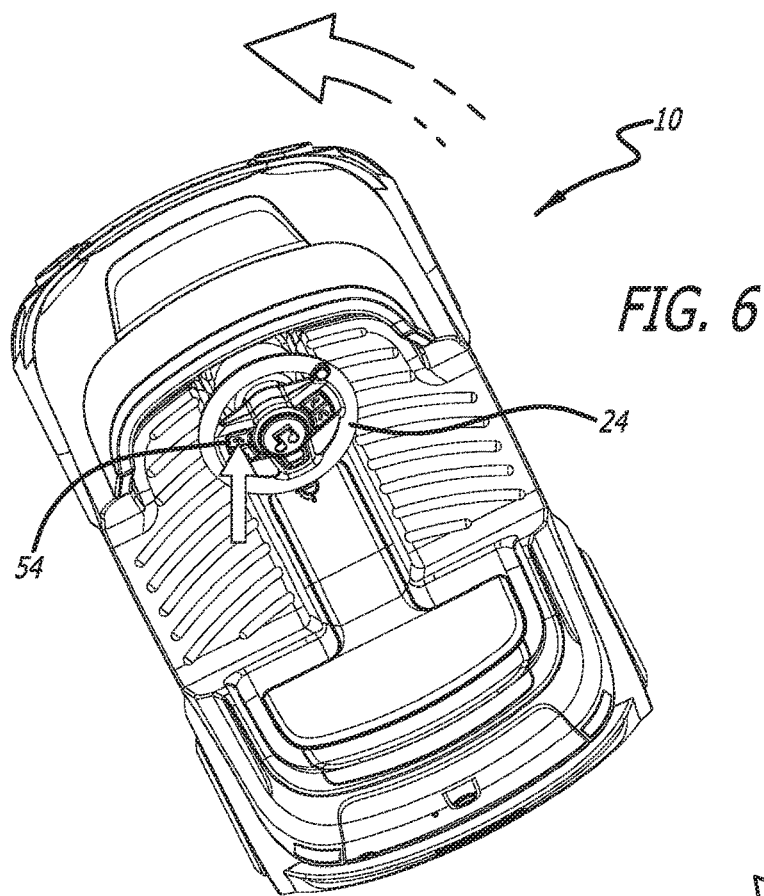
FIG. 6 is top plan view of the powered ride-on vehicle according to one embodiment showing the left spin mode drive function.
Figure 7:
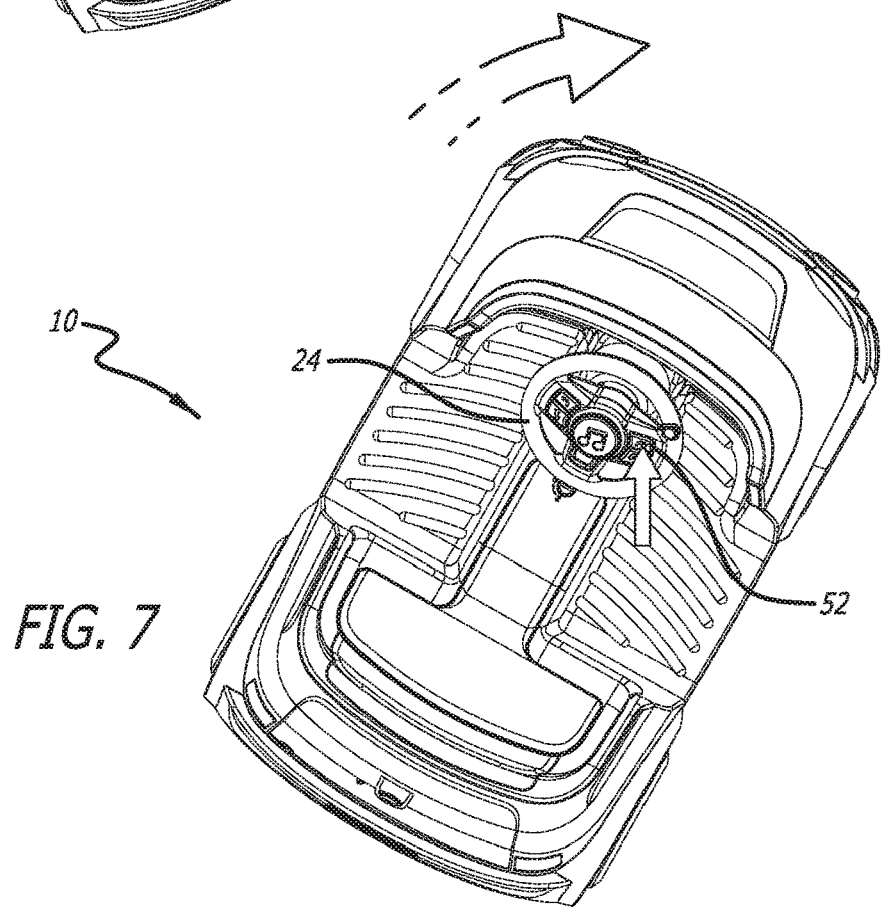
FIG. 7 is top plan view of the powered ride-on vehicle according to one embodiment showing the right spin mode drive function.

The vehicle 10 can also effectuate a spin when the "spin right" selector 52 (as shown in FIG. 7) or the "spin left" selector 54 (as shown in FIG. 6) on the steering wheel 24 is engaged. In spin mode (i.e., when the "spin right" selector 52 or the "spin left" selector 54 is engaged), one motor 28 may be fully powered forward (i.e., that motor receives a full forward voltage) while the other motor 28 may be fully powered in reverse (i.e., that motor 28 receives a full reverse voltage). In one embodiment, utilizing a 6V battery, the motor controller will send a max 6V forward signal to the one motor, and a max 6V reverse signal to the other motor (note that while a 6V battery has been described, other power sources, including other size batteries may be utilized). This can be done for a left spin or a right spin depending on which of the "spin right" selector 52 or the "spin left" selector 54 is engaged. In one embodiment, engagement of a spin selector 52 or 54 will cause the vehicle 10 to spin for approximately four seconds, or until another selector is depressed if depressed prior to the four second period. However, if the user holds down the spin selector the vehicle 10 may continue to spin for multiple four second cycles, such as, for example, four cycles. In an alternate embodiment engagement of the spin causes 180° rotation of the vehicle 10. Accordingly, as shown in FIG. 7, when the "spin right" selector 52 is engaged the vehicle 10 will spin clockwise 180°. And, as shown in FIG. 6, when the "spin left" selector 54 is engaged the vehicle 10 will spin counterclockwise 180°. By engaging one of the spin left selector 54 or the spin right selector 52, in one embodiment, the vehicle may automatically rotate for the full cycle time period (as long as another selector is not subsequently depressed during the cycle time period). Alternately, rather than always spinning for the full cycle time period, or making a full 180° rotation upon engagement of one of the spin selectors 52, 54, as soon as the operator releases the spin selector 52 or 54 that has been engaged, the vehicle 10 may ramp to a stop. In one embodiment, the music plays and the lights 46 in the light strip light up and/or blink for the entire set cycle period of time that the vehicle 10 is in "spin left" or "spin right" mode, unless another selector is subsequently depressed. Additionally, when the "spin right" selector 52 or the "spin left" selector 54 is engaged, that selector will light up and/or blink for the entire period of time that the vehicle 10 is conducting its spin move. Further, a specific song or music may be associated and played with each different selector 52, 54. In one embodiment, if the user maintains the spin selector 52 or 54 depressed during the entire set cycle period of time, a second set cycle period of time will being automatically and the movement will continue for that set cycle period of time and may continue for multiple cycles, such as four cycles if the selector is maintained as depressed.

Referring to FIG. 4, the vehicle 10 can also effectuate one of a plurality of dances in dance mode by moving in a variety of directions and speeds in succession, sometimes rather rapidly, as if the vehicle 10 were dancing.

As explained above, the vehicle 10 has a "move forward and backward" dance selector 58 on the steering wheel 24. When the "move forward and backward" dance selector 58 is engaged both motors 28 may be powered forward for a period of time, then both motors 28 may be powered in reverse for a period of time, then both motors 28 may be powered forward for a period of time, and again both motors 28 may be powered in reverse for a period of time, thereby effectuating a forward and backward dance move. In one embodiment, if the forward and backward dance move of the vehicle 10 is to be completed over a set period of time of X seconds (such as a 4 second cycle), and there are Y moves during the cycle period, then the vehicle 10 may move forward for X/Y seconds, then backwards for X/Y seconds, and this will be repeated for the Y number of moves during the X number of seconds. In one embodiment, the music plays and the lights 46 light up and/or blink for the entire period of time that the vehicle 10 is in the "move forward and backward" dance mode. Additionally, when the "move forward and backward" dance selector 58 is engaged, that selector 58 will light up or blink for the entire period of time that the vehicle 10 is conducting its dance move. However, if another selector is depressed prior to the end of the cycle period, this dance movement will end and the selected movement, music and lights associated with that selector will start. Similarly, if the depressed selector is held down for the entire duration of the cycle, the specific movement will continue for multiple cycles, such as four cycles. In a preferred embodiment a specific song or music may be associated and played following depression of dance selector 52.

Referring again to FIG. 4, the vehicle 10 can also effectuate a dance in dance mode by moving side to side in succession, sometimes rather rapidly, as if the vehicle 10 were dancing. As explained above, the vehicle 10 has a "move side-to-side" dance selector 60 on the steering wheel 24. When the "move side-to-side" dance selector 60 is engaged the controller 42 operates to effectuate the motors 28 in alternate spin modes. For example, in one embodiment, the motors 28 may be operated to spin the vehicle 10 clockwise for a set period of time (i.e., a cycle) or for a specific angular movement, such as 20°, then the motors 28 may be operated to spin the vehicle 10 counterclockwise for a period of time or for a specific angular movement, such as 20°, then the motors 28 may again be operated to spin the vehicle 10 clockwise for a period of time or for a specific angular movement, such as 20°, and finally the motors 28 may be operated to spin the vehicle 10 counterclockwise again for a period of time or for a specific angular movement, such as 20°, thereby effectuating a side-to-side dance movement of the vehicle. In one embodiment, if the side-to-side dance move of the vehicle 10 is to be completed over a cycle period of time of X seconds (such as 4 seconds), and there are Y moves during the cycle period, then the vehicle 10 may spin counterclockwise for X/Y seconds, then clockwise for X/Y seconds, and this will be repeated for the Y number of moves during the X number of seconds. In one embodiment, the music plays and the lights 46 light up and/or blink for the entire period of time that the vehicle 10 is in the "move side-to-side" dance mode. Additionally, when the "move side-to-side" dance selector 60 is engaged, that selector 60 will light up or blink for the entire period of time that the vehicle 10 is conducting its dance move. However, if another selector is depressed prior to the end of the cycle period, this dance movement will end and the selected movement, music and lights associated with that selector will start. Similarly, if the depressed selector is held down for the entire duration of the cycle, the specific movement will continue for multiple cycles, such as four cycles. In a preferred embodiment a specific song or music may be associated and played following depression of dance selector 54.

Referring to FIG. 4, the vehicle 10 can also effectuate a variety of dances with different dance "moves" for the vehicle 10 in each dance by having the user select the "dance" selector 56 on the steering wheel 24. For example, multiple dances, such as five for example, may be preprogrammed in one or more of the controllers 42, and when the "dance" selector 56 is contacted by the user the next dance in the controller queue will be conducted by the vehicle 10. For example, if dance 1 is conducted when the dance selector 56 is depressed, the next time the dance selector 56 is depressed dance 2 will be conducted by the vehicle 10. Different dances could be a country dance to country music, a hip hop dance to hip hop music, a rock dance to rock music, salsa dance to salsa music, disco dance to disco music, etc. Different dances will require different movement of the vehicle, different music being played by the vehicle, and different light effects by the vehicle. In one of the dance it may last for X seconds, such as 8 seconds. In this exemplar dance, the dance selector 56 will light up or blink for 8 seconds, and music will be played for 8 seconds. Further, the additional lights 46 on the vehicle, such as the light strip, will light up to the music for 8 seconds. In one exemplar country dance, the one or more controllers 46 will operate the motors 28 to move forward and right for X/16 seconds, then backward and left for X/16 seconds, then forward and right for X/16 seconds, then backward and left for X/16 seconds, then forward and left for X/16 seconds, then backward and right for X/16 seconds, then forward and left for X/16 seconds, then backward and right for X/16 seconds, and these will repeat until the full set time period cycle has completed. After that dance is complete, the next dance in the queue will be conducted when the dance selector 56 is engaged next. However, if the dance selector 56 is held down for the entire duration of the dance cycle, the specific dance will continue or repeat for multiple cycles, such as four cycles. And, if during a specific dance cycle the dance selector 56 is depressed again, the specific dance will end and the next dance in the queue will begin. In a preferred embodiment a specific song or music may be associated and played with a specific dance in the queue following depression of dance selector 56. Additionally, if a different selector is depressed during a dance, the dance will end and the movements, music and lights associated with that selector will begin.

In various embodiments, specific music and light actions will be associated with each selector, and with each dance of the dance selector 56. Additionally, in alternate embodiment the use may be able to program additional dances into the controller 46 of the vehicle. Further, in alternate embodiments the controller 46 may be able to generate new dances using a randomizing function. Additionally, the user may be able to connect a device, wirelessly or wired, such as a MP3 player to the controller 46 of the vehicle 10 to have music played through the speakers of the vehicle 10, and the controller 46 may create dances based on the music being played from the MP3 player. Finally, the vehicle may be able to teach the user different dances. For example, the vehicle 10, through its speakers, will say "spin left", and the user will push the spin left selector and get feedback from the vehicle, etc.

In one embodiment the vehicle 10 includes a Standby Mode and a Sleep Mode. Standby Mode is when the vehicle is ON, and it is waiting for a user to operate the vehicle through manipulation of one or more of the selector buttons. Conversely, Sleep Mode is engaged when the vehicle is ON, but after a period of time, such as, for example, ten minutes, no selectors are depressed such that there is inactivity for a set period of time, the controllers will enter the Sleep Mode to draw significantly less current from the batteries than when the vehicle is in Standby Mode. One example of the vehicle entering Sleep Mode is when the user is operating the vehicle such that it is ON, but then the user leaves the vehicle but forgets to turn the vehicle OFF. This provides for much less drain on the battery in such circumstances. To wake the vehicle back up and out of the Sleep Mode the user can engage one of the selector buttons or cycle the ON/OFF switch 32.

In another embodiment, a volume select switch (not shown) is provided for the vehicle. In one embodiment the volume select switch is a simple on/off switch specifically for volume so that a user can operate the vehicle either with the sounds (volume on) or without sounds (volume off). In another embodiment the volume select switch is a three-way switch that allows for full sound volume on, sound volume off, and lower volume on.

In an alternate embodiment, a remote control 34 and wireless receiver 35 are provided. The wireless receiver 35 is operably electrically connected to the controllers 42. The remote control 34 may have a plurality of input members, such as forward, left, right, and reverse buttons 41, a spin left button 43, a spin right button 45, a dance selector button 47, and an emergency stop button 49. The remote control 34 may also have a wireless transmitter for sending signals to the one or more controllers of the vehicle via the wireless receiver 35 in the vehicle 10. Thus, in such an embodiment the vehicle 10 can be operated in two modes of operation, including a child only drive mode and a full remote drive mode. The controllers of the vehicle switch between the two modes of operation in real time based on signals received from the remote control. For example, in one embodiment if signals are being received from the remote control the vehicle will operate in full remote drive mode and actuation of selectors, etc. on the vehicle will not have an effect on the operation of the vehicle. Alternately, if signals are not being received from the remote control the vehicle will be operated by actuation of the selectors, etc. on the vehicle.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A powered ride-on vehicle comprising:
    a frame supported by a first drive wheel, a second drive wheel and at least one non-driven support wheel;
    a first motor connected to the first drive wheel;
    a second motor connected to the second drive wheel;
    a steering wheel supported by the frame;
    a plurality of movement selectors and a dance selector;
    a steering sensor operably connected to the steering wheel to obtain an output of the angular location of the steering wheel; and,
    one or more controllers operably electrically connected to the first and second motors, the plurality of movement selectors, the dance selector, and the steering wheel sensor, wherein the controllers operate to manipulate the motors to cause movements of the vehicle for a set period of time upon depression of one of the plurality of movement selectors independent of the output obtained by the steering sensor, and wherein the controllers operate to manipulate the motors to cause dance movements of the vehicle for a set period of time upon depression of the dance selector independent of an output obtained by the steering sensor.

2. The powered ride-on vehicle of claim 1, wherein different movements of the vehicle are effected for another set period of time upon subsequent depression of the dance selector or one of the movement selectors prior to the expiration of the set period of time.

3. The powered ride-on vehicle of claim 1, wherein the plurality of movement selectors and the dance selector are connected to the steering wheel.

4. The powered ride-on vehicle of claim 1, further comprising a go selector connected to the steering wheel, wherein the controllers are further operably connected to the go selector, and wherein the controllers operate to manipulate the motors to cause the vehicle to move forward, left or right for a period of time that the go selector is depressed depending on the output of the steering sensor.

5. The powered ride-on vehicle of claim 1, wherein the at least one non-driven support wheel is a caster.

6. The powered ride-on vehicle of claim 1, wherein when one of the plurality of movement selectors or the dance selector is depressed, the controllers operate to cause the motors to move the vehicle for a set period of time independent of the output of the steering sensor until either the set period of time elapses, another of the plurality of movement selectors or the dance selector is depressed, a go selector is depressed, or until the selector that was depressed is no longer depressed and at least two cycles of the set period of time have elapsed.

7. The powered ride-on vehicle of claim 1, wherein the motors will stop moving the vehicle after the set period of time elapses and none of the plurality of movement selectors, a go selector or the dance selector has been depressed prior to the expiration of the set period of time, and if the selector that was depressed is still not depressed when the set period of time expires.

8. The powered ride-on vehicle of claim 1, wherein a first of the plurality of movement selectors operates, when depressed and in cooperation with the controllers, to cause the motors to move the vehicle in a left spin for a set period of time independent of the output of the steering sensor.

9. The powered ride-on vehicle of claim 8, wherein the motors will move the vehicle in a left spin for another set period of time, independent of the output of the steering sensor, if the first of the plurality of movement selectors is maintained depressed when the set period of time elapses.

10. The powered ride-on vehicle of claim 8, wherein the motors will stop moving the vehicle after the set period of time elapses and none of the plurality of movement selectors, go selector or the dance selector has been depressed prior to the expiration of the set period of time.

11. The powered ride-on vehicle of claim 1, wherein the controllers operate to manipulate the motors to cause a different dance movement of the vehicle upon subsequent depression of the dance selector independent of an output obtained by the steering sensor.

12. The powered ride-on vehicle of claim 11, wherein the controllers operate to manipulate the motors to cycle through at least four different dance movements based on subsequent depression of the dance selector.

13. The powered ride-on vehicle of claim 1, wherein the controllers operate to light the specific depressed movement selector of the plurality of movement selectors or the dance selector, during the set period of time, or until a different one of the plurality of movement selectors or the dance selector is selected if done prior to the expiration of the set period of time.

14. The powered ride-on vehicle of claim 1, further comprising a light strip associated with a windshield of the vehicle, and wherein the controllers operate to light the light strip for the set period of time after one of the plurality of movement selectors or the dance selector is depressed, or for another set period of time if a different one of the plurality of movement selectors or the dance selector is depressed if done prior to the expiration of the set period of time.

15. The powered ride-on vehicle of claim 1, further comprising a speaker connected to the vehicle, and wherein the controller operates to play music through the speaker during the first period of time, or until a different one of the plurality of movement selectors or the dance selector is selected if done prior to the expiration of the first period of time.

16. The powered ride-on vehicle of claim 1, further comprising a wireless receiver operably electrically connected to the controllers, and a remote control having an input member and a wireless transmitter for sending signals to the one or more controllers of the vehicle, wherein the vehicle can be operated in two modes of operation, including a child only drive mode and a full remote drive mode, and wherein the controller switches between the two modes of operation in real time based on signals received from the remote control.

17. A powered ride-on vehicle comprising:
- a frame supported by a first drive wheel, a second drive wheel and at least one non-driven support wheel;
- a first motor connected to the first drive wheel;
- a second motor connected to the second drive wheel;
- a steering wheel supported by the frame;
- a plurality of movement selectors connected to the steering wheel; and,
- one or more controllers operably electrically connected to the first and second motors and the plurality of movement selectors, wherein the controllers operate to manipulate the motors to cause movements of the vehicle for a set period of time upon depression of one of the plurality of movement selectors independent of an angular location of the steering wheel, wherein depression of each different one or more plurality of movement selectors operate to cause a different movement of the vehicle for the set period of time independent of the angular location of the steering wheel, and wherein when one of the plurality of movement selectors is depressed, the one or more controllers operate to cause the motors to move the vehicle for a set period of time independent of the angular location of the steering wheel until either the set period of time elapses, another of the plurality of movement selectors is depressed, or until the selector that was depressed is no longer depressed and at least two cycles of the set period of time have elapsed.

* * * * *